(12) United States Patent
Nandipati et al.

(10) Patent No.: US 10,960,614 B2
(45) Date of Patent: Mar. 30, 2021

(54) METHOD AND SYSTEM FOR MANUFACTURING A WIND TURBINE BLADE COMPONENT

(71) Applicant: LM WP PATENT HOLDING A/S, Kolding (DK)

(72) Inventors: Srikanth Nandipati, Andhra (IN); Mohammad Imdad Basha, Bangalore (IN); Alexious Arulraj Dhas, Kanyakumari (IN); Henrik Barslev, Kolding (DK)

(73) Assignee: LM WP PATENT HOLDING A/S, Kolding (DK)

( * ) Notice: Subject to any disclaimer, the term of this patent is extended or adjusted under 35 U.S.C. 154(b) by 144 days.

(21) Appl. No.: 16/073,890

(22) PCT Filed: Jan. 31, 2017

(86) PCT No.: PCT/EP2017/051984
§ 371 (c)(1),
(2) Date: Jul. 30, 2018

(87) PCT Pub. No.: WO2017/134027
PCT Pub. Date: Aug. 10, 2017

(65) Prior Publication Data
US 2019/0039332 A1    Feb. 7, 2019

(30) Foreign Application Priority Data
Feb. 1, 2016   (EP) ..................................... 16153684

(51) Int. Cl.
*B29C 70/38*   (2006.01)
*B29L 31/08*   (2006.01)

(52) U.S. Cl.
CPC ............ *B29C 70/382* (2013.01); *B29C 70/38* (2013.01); *B29L 2031/085* (2013.01); *Y02P 70/50* (2015.11)

(58) Field of Classification Search
CPC ..... B29C 70/382; B29C 70/38; Y02P 70/523; B29L 2031/085
(Continued)

(56) References Cited

U.S. PATENT DOCUMENTS

2007/0270996 A1\* 11/2007 Roise ..................... G06Q 10/06
                                                        700/171
2012/0138218 A1\*  6/2012 Dean .................. B29D 99/0028
                                                        156/243

FOREIGN PATENT DOCUMENTS

| CN | 104416922 A | * | 3/2015 |
| EP | 1785261 A1 | | 5/2007 |
| WO | 2010129492 A2 | | 11/2010 |

OTHER PUBLICATIONS

Extended European search report dated May 16, 2018 for corresponding application No. 16153684.2.

\* cited by examiner

*Primary Examiner* — Michael N Orlando
*Assistant Examiner* — Abhishek A Patwardhan
(74) *Attorney, Agent, or Firm* — Nath, Goldberg & Meyer; Jerald L. Meyer; Tanya E. Harkins

(57) ABSTRACT

Methods for manufacturing a wind turbine blade component using a layup head for automatic or semi-automatic layup of fibre material as ply sections from respective rolls of a plurality of rolls in a blade component mould are described. The methods generally include: defining a list of ply sections for the blade component including the layup sequence and length of each ply section; generating a selection of layup plans using the list, a subset of the plurality of rolls and the (Continued)

initial lengths of fiber material on the rolls; selecting one layup plan in constraint of at least one criterion, such as optimisation of the remaining amount of fibre material waste on the plurality of rolls in a length direction, and controlling the layup head and plurality of rolls to perform the selected layup plan in manufacturing of the blade component in the blade component mould.

18 Claims, 10 Drawing Sheets

(58) Field of Classification Search
USPC .......................................................... 156/60
See application file for complete search history.

| Layup plan | Ply section length |
|---|---|
| Ply section 1 | Length (X1) |
| Ply section 2 | Length (X2) |
| Ply section 3 | Length (X3) |
| Ply section 4 | Length (X4) |
|  |  |
|  |  |
| . . . | . . . |
| Ply section n | Length (Xn) |

| Roll length | Target1 | Target2 |
|---|---|---|
| X | 0.95 * (X) | 0.99 * (X) |
| X-Y | 0.95 * (X-Y) | 0.99 * (X-Y) |
| X-2*Y | 0.95 * (X-2*Y) | 0.99 * (X-2*Y) |
| X-3*Y | 0.95 * (X-3*Y) | 0.99 * (X-3*Y) |
| X-4*Y | 0.95 * (X-4*Y) | 0.99 * (X-4*Y) |
| X-5*Y | 0.95 * (X-5*Y) | 0.99 * (X-5*Y) |
| X-6*Y | 0.95 * (X-6*Y) | 0.99 * (X-6*Y) |
| X-7*Y | 0.95 * (X-7*Y) | 0.99 * (X-7*Y) |
| X-8*Y | 0.95 * (X-8*Y) | 0.99 * (X-8*Y) |
| X-9*Y | 0.95 * (X-9*Y) | 0.99 * (X-9*Y) |
| X-10*Y | 0.95 * (X-10*Y) | 0.99 * (X-10*Y) |
| . . . | . . . | . . . |
| X-n*Y | 0.95 * (X-n*Y) | 0.99 * (X-n*Y) |

| Possible sets | Possible sets | Possible sets |
|---|---|---|
| Set (1-6); W1_1 | Set (12-19); W2_1 | Set (14-22); W3_1 |
| Set (2-8); W1_2 | Set (12-19); W2_2 | Set (14-22); W3_2 |
| Set (3-9); W1_3 | Set (10-16); W2_3 | Set (11-17); W3_3 |
| Set (4-9); W1_4 | Set (4-10); W2_4 | Set (5-11); W3_4 |
| Set (1-5); W1_5 | Set (12-18); W2_5 | Set (15-22); W3_5 |
| Set (2-6); W1_6 | Set (13-19); W2_6 | Set (20-29); W3_6 |
| Set (3-6); W1_7 | Set (9-14); W2_7 | Set (10-15); W3_7 |
| Set (4-8); W1_8 | Set (5-10); W2_8 | Set (6-11); W3_8 |
| Set (5-9); W1_9 | Set (13-18); W2_9 | Set (16-22); W3_9 |
| Set (2-5); W1_10 | Set (14-19); W2_10 | |
| Set (3-6); W1_11 | Set (9-13); W2_11 | |
| . . . | . . . | |
| Set (5-7); W1_n | Set (10-12); W2_n | |

*Fig. 5 (cont.)*

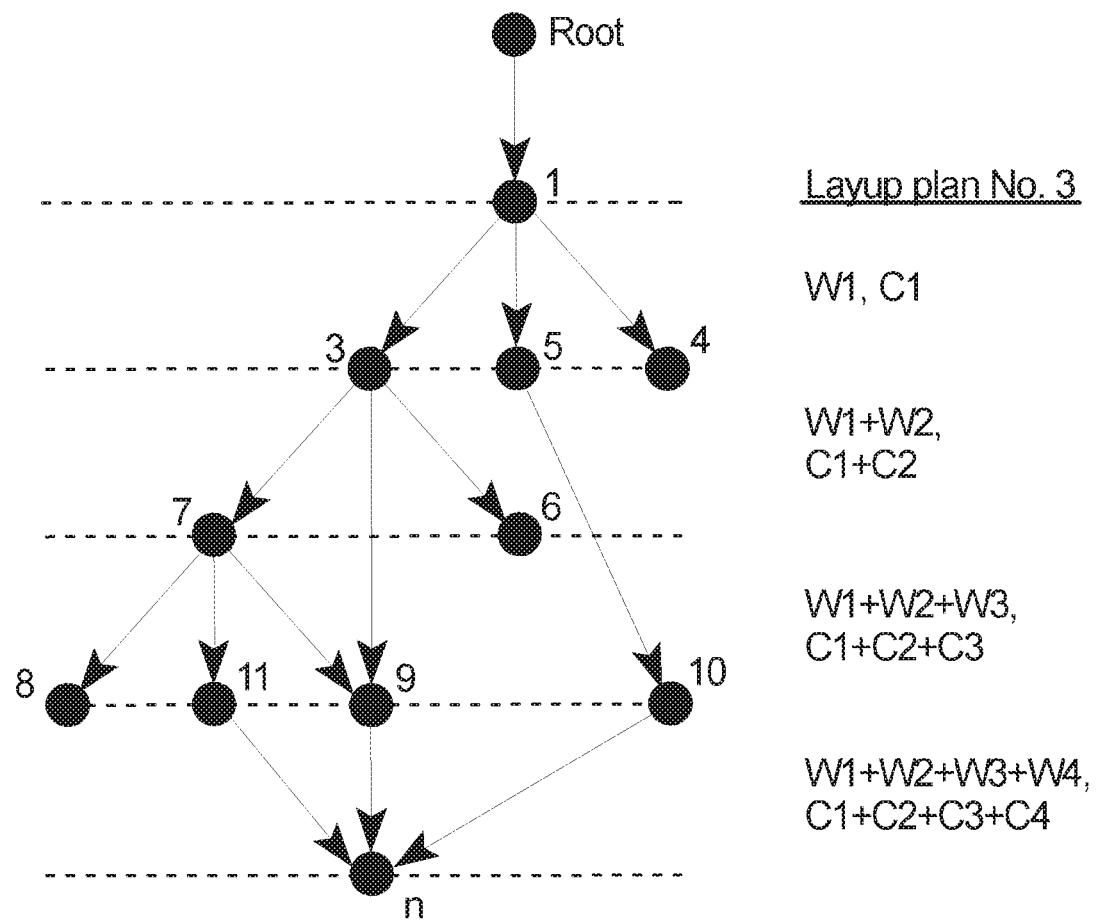
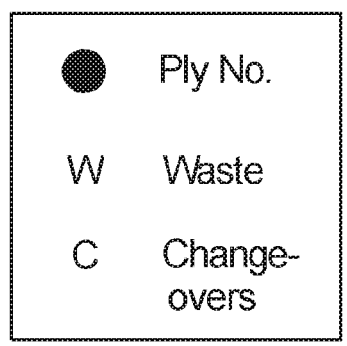
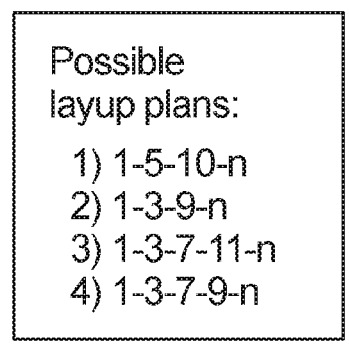
Fig. 6

| Layup plan | Ply section length | Waste and change-overs |
|---|---|---|
| Ply section 1 | Length (X1) | W1, C1 |
| Ply section 2 | Length (X2) | W1, C1 |
| Ply section 3 | Length (X3) | W1+W2, C1+C2 |
| Ply section 4 | Length (X4) | W1+W2, C1+C2 |
| Ply section 5 | Length (X5) | W1+W2, C1+C2 |
| Ply section 6 | Length (X6) | W1+W2, C1+C2 |
| Ply section 7 | Length (X7) | W1+W2+W3, C1+C2+C3 |
| Ply section 8 | Length (X8) | W1+W2+W3, C1+C2+C3 |
| Ply section 9 | Length (X9) | W1+W2+W3, C1+C2+C3 |
| Ply section 10 | Length (X10) | W1+W2+W3, C1+C2+C3 |
| Ply section 11 | Length (X11) | W1+W2+W3?W4, C1+C2+C3+C4 |
| . . . | . . . | . . . |
| Ply section n | Length (Xn) | W1+W2+W3?W4, C1+C2+C3+C4 |

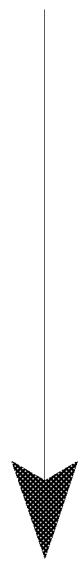

*Fig. 7*

| Possible plans | Roll change-overs | | | |
|---|---|---|---|---|
| | Ideal+1 | Ideal+2 | Ideal+3 | Ideal+4 |
| Plan 1 | x1 % | y1 % | z1 % | w1 % |
| Plan 2 | x2 % | y2 % | z2 % | w2 % |
| Plan 3 | x3 % | y3 % | z3 % | w3 % |
| Plan 4 | x4 % | y4 % | z4 % | w4 % |
| Plan 5 | x5 % | y5 % | z5 % | w5 % |
| Plan 6 | x6 % | y6 % | z6 % | w6 % |
| Plan 7 | x7 % | y7 % | z7 % | w7 % |
| Plan 8 | x8 % | y8 % | z8 % | w8 % |
| Plan 9 | x9 % | y9 % | z9 % | w9 % |
| Plan 10 | x10 % | y10 % | z10 % | w10 % |
| Plan 11 | x11 % | y11 % | z11 % | w11 % |
| Plan 12 | x12 % | y12 % | z12 % | w12 % |
| Plan 13 | x13 % | y13 % | z13 % | w13 % |
| Plan 14 | x14 % | y14 % | z14 % | w14 % |
| Plan 15 | x15 % | y15 % | z15 % | w15 % |
| Plan 16 | x16 % | y16 % | z16 % | w16 % |
| Plan 17 | x17 % | y17 % | z17 % | w17 % |
| Plan 18 | x18 % | y18 % | z18 % | w18 % |
| Plan 19 | x19 % | y19 % | z19 % | w19 % |
| Plan 20 | x20 % | y20 % | z20 % | w20 % |
| Plan 21 | x21 % | y21 % | z21 % | w21 % |
| Plan 22 | x22 % | y22 % | z22 % | w22 % |
| Plan 23 | x23 % | y23 % | z23 % | w23 % |
| Plan 24 | x24 % | y24 % | z24 % | w24 % |
| Plan 25 | x25 % | y25 % | z25 % | w25 % |
| Plan 26 | x26 % | y26 % | z26 % | w26 % |
| Plan 27 | x27 % | y27 % | z27 % | w27 % |
| Plan 28 | x28 % | y28 % | z28 % | w28 % |
| Plan 29 | x29 % | y29 % | z29 % | w29 % |
| Plan 30 | x30 % | y30 % | z30 % | w30 % |
| Plan 31 | x31 % | y31 % | z31 % | w31 % |
| Plan 32 | x32 % | y32 % | z32 % | w32 % |
| Plan 33 | x33 % | y33 % | z33 % | w33 % |
| Plan 34 | x34 % | y34 % | z34 % | w34 % |

Fig. 8

| Ply No. | Ply Length | ΣPly Length | Waste | Roll No. |
|---|---|---|---|---|
| 1 | 47.5 | | | |
| 2 | 47.0 | | | |
| 3 | 45.0 | | | |
| 4 | 47.5 | | | |
| 5 | 39.0 | | | |
| 6 | 35.0 | | | |
| 7 | 34.0 | 295.0 | 2.0 | 1 |
| 8 | 37.5 | | | |
| 9 | 34.5 | | | |
| 10 | 35.0 | | | |
| 11 | 40.0 | 147.0 | 150.0 | 2 |
| 12 | 40.0 | | | |
| 13 | 39.5 | | | |
| 14 | 39.0 | | | |
| 15 | 37.0 | | | |
| 16 | 36.5 | | | |
| 17 | 36.0 | | | |
| 18 | 33.0 | | | |
| 19 | 30.0 | 291.0 | 6.0 | 3 |
| ... | ... | | | |
| 32 | 15.0 | 296.0 | 1.0 | 4 |
| 33 | 13.0 | | | |
| 34 | 12.5 | | | |
| 35 | 11.0 | | | |
| 36 | 10.5 | | | |
| 37 | 10.5 | | | |
| 38 | 46.0 | | | |
| 39 | 44.5 | 148.0 | 2.0 | 2 |

*Fig. 9*

METHOD AND SYSTEM FOR MANUFACTURING A WIND TURBINE BLADE COMPONENT

This is a National Phase Application filed under 35 U.S.C. 371 as a national stage of PCT/EP2017/051984, filed Jan. 31, 2017, an application claiming the priority benefit of EP 16153684.2 filed Feb. 1, 2016, the content of each of which is hereby incorporated by reference in its entirety.

FIELD OF THE INVENTION

The invention relates to a method and a system for manufacturing a wind turbine blade component.

BACKGROUND OF THE INVENTION

The manufacture of a wind turbine blade component such as a blade half shell or a section of a blade half shell generally involves the layup of fibre material in a shaped mould. The fibre material is normally applied as ply sections or strips. The different ply sections are applied successively according to a predefined layup plan for the blade component.

A resin may then be applied to the fibre material in the mould. The resin is allowed to cure to form the moulded blade component.

Traditionally, the layup material is manually applied to the surface of the mould. However, as some blade components are comparatively large, for example modern wind turbine blades can be in excess of 40 meters in length, such manual layup results in considerable cycle times for the manufacture of a such blade components.

In an effort to reduce the manufacturing time for the blade component, fibre material can be dispensed from a layup head controlled by an operator. The layup head is arranged to apply such material from a roll provided at or on the layup head, the material applied along a linear application plane. The layup head is mounted on a wagon and can be moved relative to the mould, to dispense ply sections of the fibre material along any desired mould portion.

The roll of the layup head is replaced by the operator with a new roll when the remaining fibre-material is too short for the next ply section to be dispensed according to the layup plan for the blade component. The manufacturing of a wind turbine blade component hereby leaves remaining fibre material on the used rolls as surplus material.

It is an object of the invention to provide an improved method and system for manufacturing a wind turbine blade component which seeks to reduce these problems.

SUMMARY OF THE INVENTION

The invention relates to a method for manufacturing a wind turbine blade component using a layup head for automatic or semi-automatic layup of fibre material as ply sections or strips from respective rolls of a plurality of rolls in a blade component mould, said method comprising the steps of:

a) defining a list of ply sections for the blade component including a layup sequence for the ply sections and a length of each ply section, b) generating a selection of layup plans using at least said list of ply sections, at least a subset of said plurality of rolls and the initial lengths of fibre material on said plurality of rolls, c) selecting one layup plan of said selection of layup plans in constraint of at least one first criterion, said at least one first criterion comprises optimisation of a remaining amount of fibre material waste on said plurality of rolls in a length direction, and d) controlling the layup head and said plurality of rolls with computing means to perform the selected layup plan in manufacturing of the blade component in the blade component mould.

The method ensures a more efficient use of the fibre material in the manufacturing of a wind turbine blade component by including pre-planning steps. The method also ensures that no unnecessary cycle time is added to the manufacturing process.

The phrase "initial lengths of fibre material on said plurality of rolls" should be understood as any fibre material length present on a roll when it initially enters into the manufacturing process of a wind turbine blade component. Any process damage induced into the first layer of fibre material on a roll may for example be removed to achieve an "initial length of fibre material" on a roll. It is understood that the fibre material is continuous on the roles and that the ply sections are cut from the role while in the layup head as the layup plan is followed.

The term "waste" should be understood broadly as surplus fibre material on a roll in the manufacturing of a specific wind turbine blade component.

For example, a full role may have an initial length of 300 m of fibre material. Such a role may be utilized for layup of ply sections until the length of the next ply section is greater than the remaining glass fibre material on the role. There may then be a changeover to a new role and the remaining glass fibre material would be regarded as waste. It is an object of the present invention to reduce such waste.

Preferably, each of said layup plans comprise different sequence sets of consecutive ply sections from said list of ply sections distributed on said at least a subset of said plurality of rolls to perform layup of the full list. The possible sequence sets reveal the potential uses of a roll in relation to advantageously establishing the full list.

Preferably, said sequence sets of consecutive ply sections distributed on a roll are generated within a first and second predefined target value of the initial length on the roll and/or subsections hereof. The target values define an advantageous window for a roll in relation to the optimizing of the fibre material waste criterion.

Preferably, said subsections of an initial length (X) on a roll are a predefined number of subsections. The limited number of subsections ensures a manageable selection of layup plans.

Preferably, said predefined subsections are ½*initial length (X/2), ⅓*initial length (X/3), ¼*initial length (X/4) . . . until 1/n*initial length (X/n) reaches a predefined minimum length or said predefined subsections are the initial length minus a value (X−value), initial length minus twice the value (X−2*value), initial length minus three times the value (X−3*value) . . . until a predefined minimum length is reached. Hereby are advantageous embodiments of the invention reached in relation to defining solutions with a small or large number of layup plans.

Preferably, said first and second predefined target values are in the range of 0.95 to 0.97 and 0.99 to approx. 1.00*the initial length (X) of the roll and/or subsections hereof such as values of 0.95 and 0.99, respectively. Hereby a selection of layup plans is generated where the plans may ensure reasonable to advantageous waste values.

Preferably, said criterion of the selected layup plan comprises a remaining amount of fibre material waste of less than 1% of the initial length of fibre material on said at least a subset of said plurality of rolls. Hereby an advantageous embodiment of the invention is achieved having an efficient use of fibre material.

Preferably, a second criterion for selecting one layup plan comprises optimisation of the number of additional changeovers of rolls in said layup head with respect to an ideal number of changeovers. Hereby advantageous embodiment of the invention may be achieved which reduce fibre material waste and, at the same time, keep cycle time as low as possible by limiting the number of necessary changeovers of rolls.

The term "changeovers" should be understood as setting up a new or partly used roll in the layup head. The ideal number of changeovers corresponds to the number of changeovers necessary when no optimization of the method for manufacturing a wind turbine blade component is performed.

Preferably, said number of changeovers is the same or less than a predefined limit value in the manufacturing of the wind turbine blade component such as the same or less than 4 changeovers, 5 changeovers or 6 changeovers, as changeovers of rolls negatively impacts cycle time.

In an embodiment of the invention a third criterion for selecting one layup plan comprises a timing of changeovers of rolls with a requirement for placing a core material in the blade component mould so that the changeover is performed while the core material is placed in the mould.

When manufacturing wind turbine blade components such as, for example a blade half shell, a core material such as balsa wood or synthetic polymeric material is typically placed in between certain fibre layers or on top of certain ply sections for structural reasons. During the placement of the core material in the mould, the layup of ply sections must be interrupted for the time it takes to arrange the core material in the mould. During this interruption it is desirable to perform a role changeover which also takes time. In this way, production time is reduced for the component.

For example, a certain blade shell design may imply arrangement of balsa in the mould after layup of ply section no. 7. The third criterion will now trigger a search for layup plans according to the at least one first criterion which suggest a changeover of rolls after ply section no. 7.

If such a layup plan exists, it may then be considered as the layup plan selected for the manufacturing of that particular blade shell design.

Thus according to these embodiments utilizing the third criterion together with the at least one first criterion, it may be acceptable with a slight increase in the remaining amount of fibre material waste on the plurality of rolls which is then compensated for by savings in the time spent to produce the wind turbine blade component by performing a changeover of rolls simultaneously with the arrangement of core material in the mould.

Preferably, mathematical combinatorics such as tree structure modelling is used in generating said selection of layup plans. Tree structure modelling is one especially well-suited logic way of deriving an optimal selection of possible layup plans. In an embodiment of the invention the generating a selection of layup plans is performed with computing means.

Preferably said list of ply sections comprises the ply sections necessary to the manufacture of a blade half shell or sections of a half shell as said wind turbine blade component.

The invention also relates to an advantageous system for manufacturing a wind turbine blade component.

According to an embodiment of the invention the layup head is located in a wagon adapted for moving in different directions in or at the mould.

Preferably the wagon or the mould comprises storage for a plurality of rolls.

According to embodiments of the invention the fibre material (11) comprises glass fibre, carbon fibre, hybrids or combinations hereof.

In preferred embodiments of the invention the wind turbine blade component is a blade half shell or sections of a blade half shell.

THE FIGURES

An embodiment of the invention will now be described, by way of example only, with reference to the accompanying drawings, which will be understood to be illustrative only, and are not provided to scale.

FIG. 5 (cont.) is the second half of the table in FIG. 5;

FIG. 6 is an example of tree structure modelling for selecting a layup plan between selections of layup plans;

FIG. 7 is a table of the defined list with ply sections and lengths of the ply sections for the tree structure modelling illustrated in FIG. 6;

FIG. 8 is a table disclosing waste values at different numbers of roll changeovers in relation to the selection of plans; and FIG. 9 is a table disclosing an example of a layup plan for a wind turbine blade component according to the invention.

DETAILED DESCRIPTION

Figure 1:
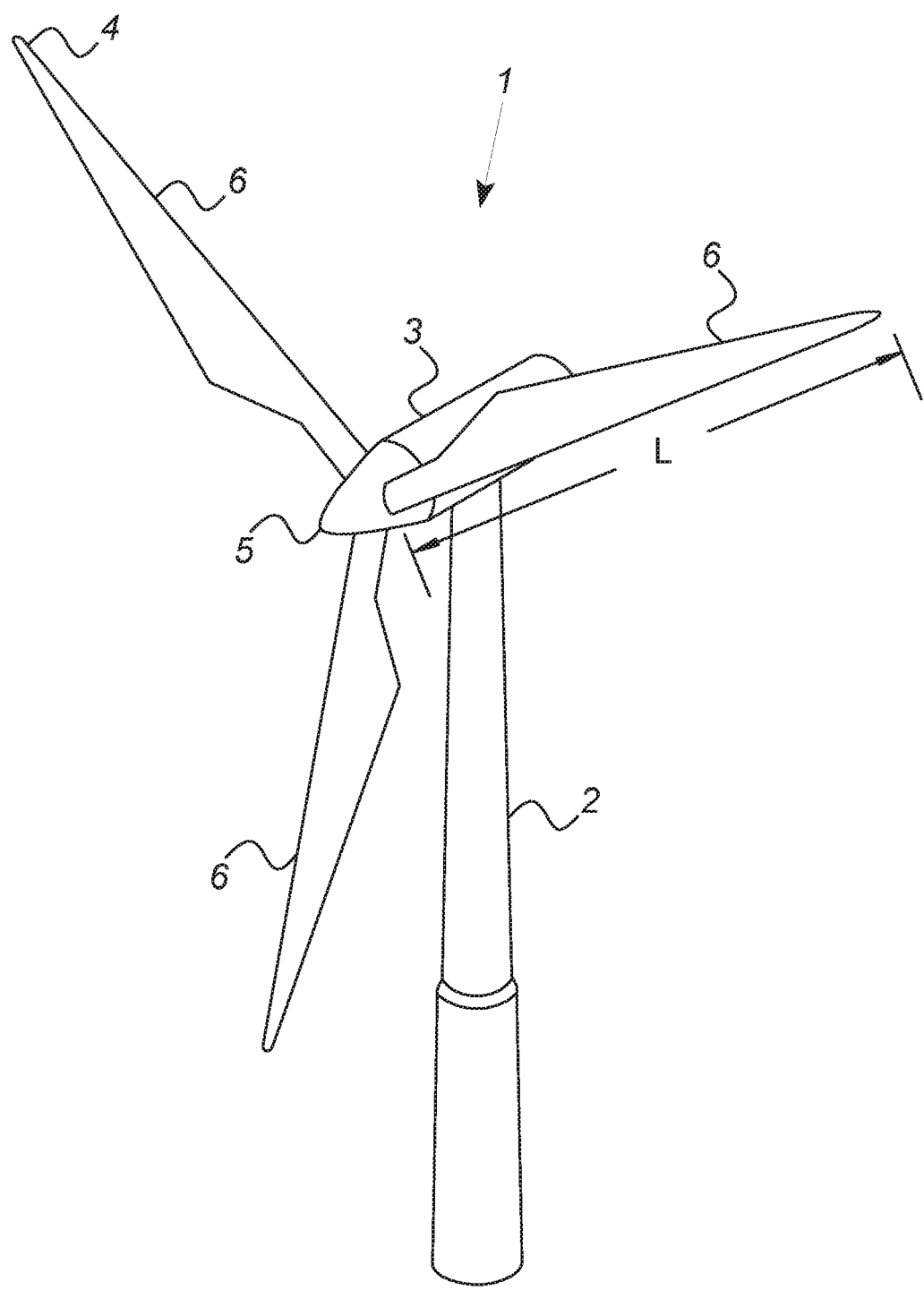
FIG. 1 is an isometric perspective view of a modern wind turbine with three wind turbine blades.

FIG. 1 illustrates an isometric perspective view of a modern wind turbine 1 that comprises a wind turbine tower 2 and a wind turbine nacelle 3 mounted on the tower 2. A rotor 4 of the wind turbine includes a wind turbine hub 5 and three wind turbine blades 6 extending radially from the hub. Each of the wind turbine blades 6 have a length denoted L from root to tip.

Figure 2A:
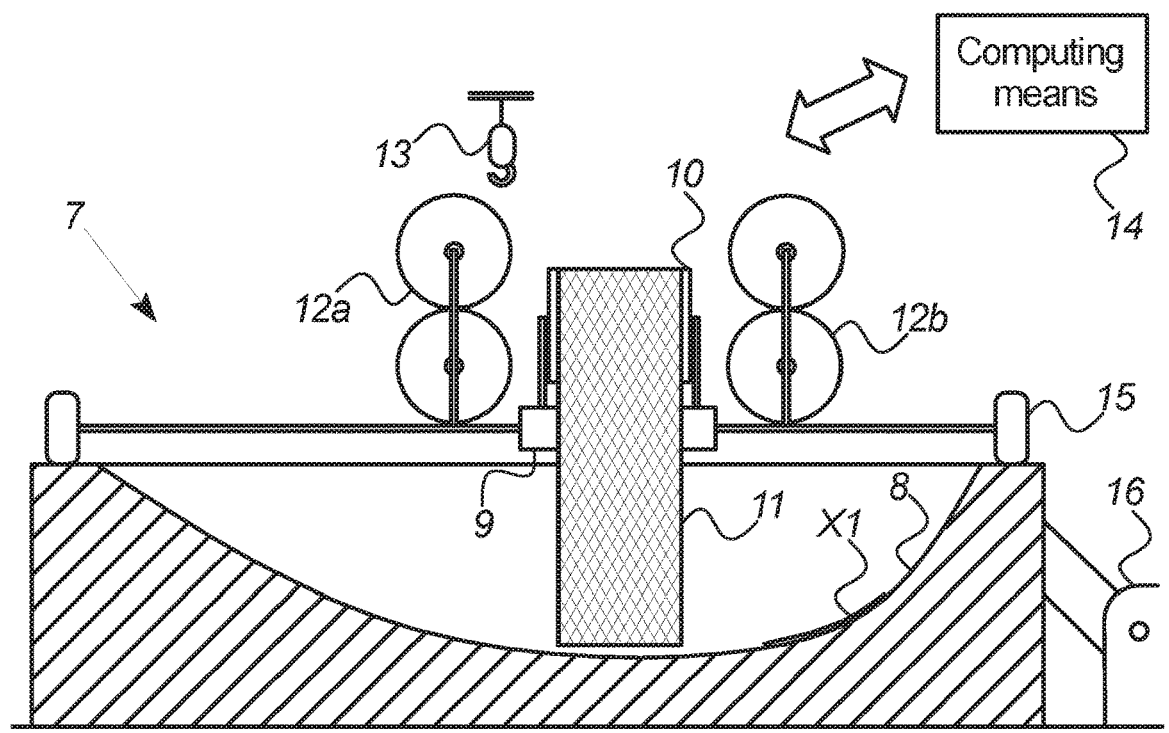
FIG. 2a is a cross-sectional view of a mould and layup head for manufacturing a wind turbine blade component.

FIG. 2a illustrates a cross-sectional view of a system 7 for manufacturing a wind turbine blade component such as a shell half or sections of a shell half to be used in a wind turbine blade. The sections of a shell half may for example be a root and tip section together with one or more center sections in manufacturing a number of blade sections for later connection e.g. at or in proximity of a wind turbine site.

The system 7 illustrated in FIG. 2a comprises a mould 8 and a layup head 9 for a fibre material such as glass fibre, carbon fibre, hybrids or combinations hereof. A roll 10 of the fibre material is positioned in the layup head 9 for dispensing sections of fibre material 11 on the surface of the mould 8.

Each dispensed length of fibre material in the mould 8 by the layup head 9 is mentioned in the following text as a ply section such as ply section X1 illustrated in the mould 8 of the figure.

The layup head 9 is located in a wagon 15 with wheels, as illustrated schematically in FIG. 2a, wherein the wagon and layup head may be moved relative to the mould 8, to dispense ply sections of the fibre material along any desired mould portion.

Storage facility for further rolls of fibre material 12a, 12b are located on the wagon or in proximity of the wagon 15 and the mould 8. Lifting means 13 perform changeovers of rolls between the storage facility and the layup head 9 wherein the lifting means 13 may be an overhead hoist, a mobile crane next to the mould or other suitable lifting means for performing the roll changeover.

The system 7 for manufacturing a wind turbine blade component also comprises computing means 14 for controlling the manufacturing process of a wind turbine blade component. The computing means 14 may include any necessary hardware and software such a central processor unit and permanent and temporary data storage for executing a software program.

Figure 2B:
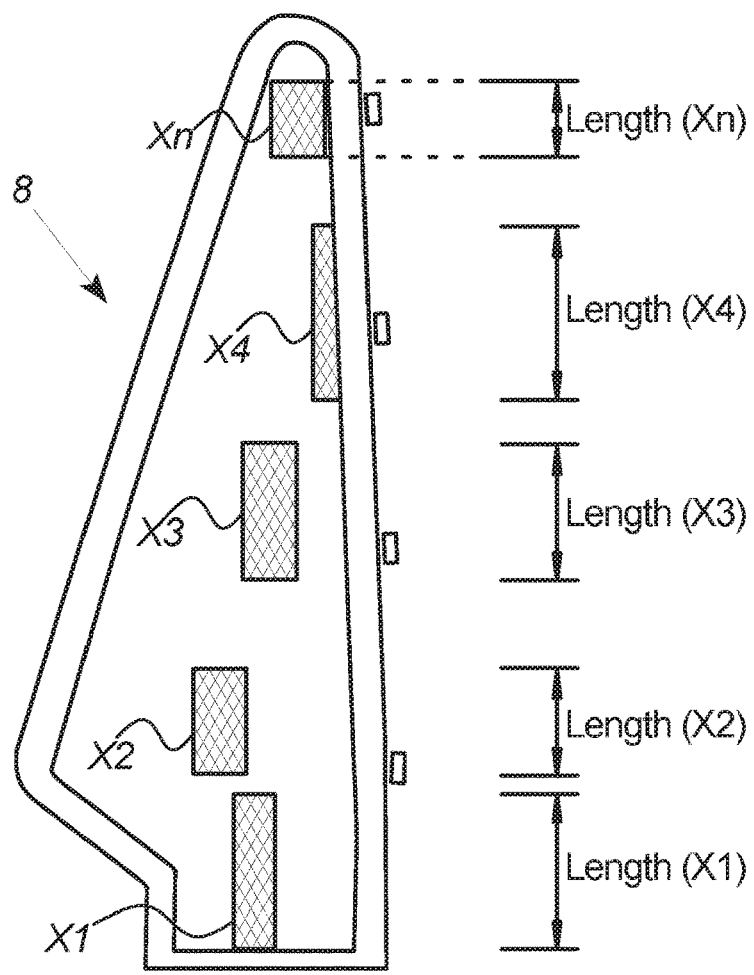
FIG. 2b is an overhead view of the mould illustrated in FIG. 2a with a number of ply sections laid up in the manufacturing of a wind turbine blade component.

FIG. 2b illustrates an overhead view of the mould 8 presented in FIG. 2a with a number of ply sections X1 to Xn laid up in the manufacturing of a wind turbine blade component.

The ply sections X1 to Xn in FIG. 2b are laid up with a layup head (not illustrated in the figure) with individual lengths from length (X1) to length (Xn). The illustrated lengths X1 to Xn are illustrated as separate short ply sections to preserve clarity of the figure but a number of ply sections may have a length close to the full length of the mould and ply sections may overlap with other ply sections or be placed more or less on top of each other.

Figure 3:
FIG. 3 is a list of ply sections for a wind turbine blade component with the individual length of each section.

FIG. 3 illustrates a list of ply sections for manufacturing a wind turbine blade component in a mould.

The list is made before the manufacturing process is started and defines the layup sequence for the required ply sections—ply section 1 followed by ply section 2, followed by ply section 3 etc. until ply section n is reached. The list also defines the specific length of each ply section.

Figure 4:
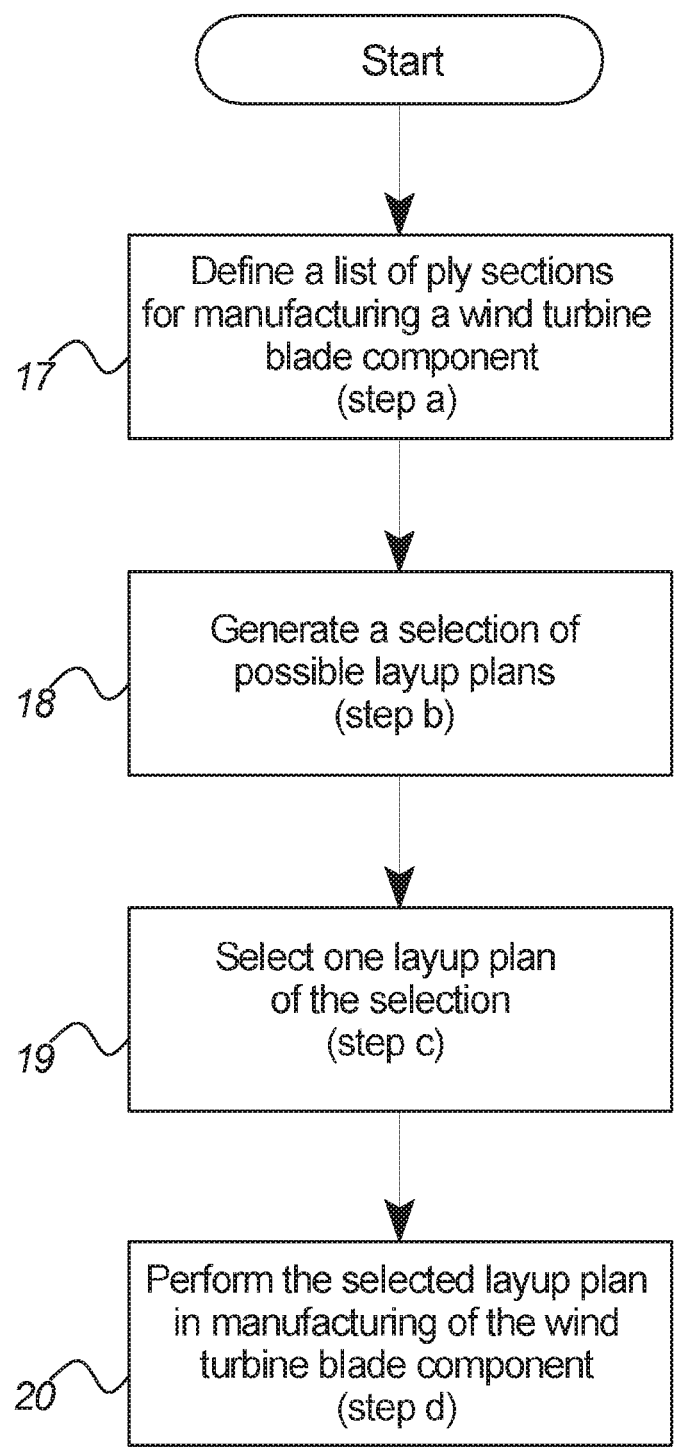
FIG. 4 is a flow diagram of a method for manufacturing a wind turbine blade component according to the invention.

FIG. 4 illustrates a flow diagram of a method for manufacturing a wind turbine blade component according to the invention.

A first step a) in the flow diagram defines a list of ply sections for a blade component including a layup sequence and length of each ply section as illustrated in FIG. 3.

Step b) generates a selection of layup plans using at least said list of ply sections, at least a subset of the plurality of rolls and the initial lengths of fibre material on said plurality of rolls.

Step c) selects one layup plan of said selection of layup plans in constraint of at least one criterion, said at least one criterion comprises optimisation of the remaining amount of fibre material waste on said plurality of rolls in a length direction.

The combinatorial problem and optimisation solved with steps b) and c) may be performed with or without computing means.

Step d) controls the layup head and said plurality of rolls with computing means to perform the selected layup plan in manufacturing of the blade component in the blade component mould.

Figure 5:
FIG. 5 is a first half of a table illustrating different parts of available plans for manufacturing a wind turbine blade component.

FIGS. 5 and 5 (cont.) illustrate an embodiment of the invention with generation of a selection of layup plans for the list of ply sections.

The first column of the table mentions lengths of fibre material on a roll. The value X in the row is the initial length of fibre material such as 300 meters and Y may be a predefined value such as 20 meters advising row values of 300 meters, 280 meters, 260 meters, 240 meters . . . in the suggested embodiment.

A minimum length is predefined and the predefined minimum length may for example be 50 or 100 meters in the suggested embodiment. The predefined minimum length is a value wherein the remaining fibre material length on a roll makes it undesirable to perform a further roll changeover.

The first column may also be chosen as fractions of X such as X, X/2, X/3, X/4 and X/5 in another embodiment with fewer values and possible layup plans until a predefined minimum length is reached as mentioned above.

The second and third column "Target1" and "Target2" define a target window for each roll length wherein Target1 and Target2 are mentioned as 0.95 and 0.99 in the embodiment suggesting that a target should be the larger than 95% and lower than 99% of a roll length i.e. for a roll length X:

$$0.95*X<\text{length of a possible sequence set}<0.99*X.$$

In order to derive lowest wastage the limits 1% to 5% (i.e. corresponding to the range of 0.95 to 0.99) wastage are considered as acceptable in the embodiment, and some fibre material wastage is unavoidable such as wrinkles and process damage hence 1% minimum limit and is extended to max 5% as more than 5% will lead to more fibre material wastage/unusable left over material which is not acceptable with the method. Other values than 0.95 and 0.99 are possible for example a value of 0.97 if embodiments suggest a need for lower waste or if wrinkles and process damage may be avoided and allow a limit value of approx. 1.00 instead of 0.99. A value lower than 0.95 such as 0.90 may also be used if the selection of possible layup plans needs to be higher than suggested with the above target window.

The fourth column discloses examples of possible sequence sets for the different lengths of fibre material on a roll according to a list comprising 29 ply sections in the embodiment.

The example in the first row of column four suggests that ply sections 1 to 6 is a possible sequence set within the target window. The possible sequence set will also result in a specific waste value W1_1 defined by the sum of the lengths of the ply section subtracted from the present roll length i.e.:

$$\text{Set}(1\text{-}6); W1\_1 = 0.99*X - \text{length of possible sequence set}(1\text{-}6).$$

The examples in the first row of column five and six suggest that ply sections 12 to 19 and ply sections 14 to 22 are further possible sequence sets within the target window. The two possible sequence sets will also result in waste values W2_1 and W3_1:

$$\text{Set}(12\text{-}19); W2\_1 = 0.99*X - \text{length of possible sequence set}(12\text{-}19)$$

$$\text{Set}(14\text{-}22); W3\_1 = 0.99*X - \text{length of possible sequence set}(14\text{-}22).$$

The generation of possible sequence sets in the first row and waste values will continue—if possible—as:

$$\text{Set}(x\text{-}y); W4\_1 = 0.99*X - \text{length of possible sequence set}(x\text{-}y)$$

$$\text{Set}(z\text{-}w); W5\_1 = 0.99*X - \text{length of possible sequence set}(z\text{-}w)$$

. . . ; . . .

until every possible sequence set has been added to the first row.

The same generation of possible sequence sets and waste values will be performed in the second row and the further rows as illustrated in the figure until the minimum value for the roll length has been reached.

It should be emphasized that the table is only illustrated with a very limited number of possible sequence sets in order to preserve clarity of the table. The lower rows such as roll length "X−10*Y" are illustrated with empty fields in the sixth column to suggest that the reduced roll length provides few possible sequence sets and waste values in comparison to the many sets of the full roll length in the first row.

Waste values in a layup plan such as the above-mentioned W1_1 to W5_1 may still have the same values even though they are labelled differently and may also have the value of nil after layup of fibre material.

The generated table in FIG. 5 provides a database for establishing a selection of layup plans for the defined list of ply sections.

FIG. 6 illustrates a selection of one layup plan in the selection of possible layup plans using an example of tree structure modelling.

The tree structure modelling starts at a level or ply node with a first roll of fibre material and a defined list of ply sections 1-n. The possible sequence sets for the first roll are set (1-2), set (1-3) and set (1-4).

The latter set is terminated in the logic tree as an example of the logic tree modelling by the waste value in the next level or ply node being larger than the target window and hence discarded/terminated in the modelling process.

The second roll of fibre material suggests possible sequence set (3-5), (3-6) and (3-8) in continuation of the first set (1-2) and set (5-9) in continuation of first set (1-4).

The third roll of fibre material suggests set (7-10) in continuation of sets (1-2) and (3-6), set (7-8) in continuation of sets (1-2) and (3-6), set (9-n) in continuation of sets (1-2) and (3-8) and set (10-n) in continuation of sets (1-4) and (5-9).

The fourth roll of fibre material suggests set (11-n) in continuation of sets (1-2), (3-6) and (7-10) and set (9-n) in continuation of sets (1-2), (3-6) and (7-8).

The tree structure modelling hereby discloses four possible layup plans using three or four rolls and roll changeovers Cx. The changeovers may also include the same roll being used partly and later reintroduced in the sequence of the layup plan by a roll changeover wherein the remaining fibre material on the roll is used.

Each plan has a waste value Wx per used roll and also a remaining amount of fibre material waste for all the used rolls wherein one plan is selected from the layup plans. The one plan is selected in constraint of the remaining amount of fibre material waste on the plurality of rolls.

The waste value Wx of one roll may be different from or the same as waste values for other rolls in a layup plan and the values may also be nil.

The figure suggests that layup plan no. 3 (sets (1-2), (3-6), (7-10) and (11-n)) provides the best optimization of the remaining amount of fibre material waste for the four used rolls in comparison with the other three possible plans.

FIG. 7 illustrates a table of the defined list with ply sections and lengths of the ply sections for the tree structure modelling in FIG. 6 as well as a third column illustrating the fibre material waste per roll and the number of roll changeovers of the selected layup plan.

FIG. 8 illustrates an example with a table disclosing remaining amount of fibre material waste (x1-w34) at different numbers of roll changeovers in relation to the 34 possible plans as generated using a list of the ply sections/ply section lengths, number of rolls and the initial lengths of fibre material on the rolls.

Some of the remaining amount of fibre material waste (x1-w34) may have same values regardless of the individual labelling as well as have the value of nil.

A plan is selected among the possible plans 1-34 of the table in relation to the best remaining amount of fibre material waste as a first constraining criterion. Otherwise it is possible to select a plan among the possible plans 1-34 of the table in relation to the best remaining amount of fibre material waste with the lowest number of changeovers as a first and second constraining criterion.

A third criterion for selecting one layup plan may comprise a timing of changeovers of rolls with a requirement for placing a core material in the blade component mould so that the changeover is performed while the core material is placed in the mould.

When manufacturing wind turbine blade components such as, for example a blade half shell, a core material such as balsa wood or synthetic polymeric material is typically placed in between certain fibre layers or on top of certain ply sections for structural reasons. During the placement of the core material in the mould, the layup of ply sections must be interrupted for the time it takes to arrange the core material in the mould. During this interruption it is desirable to perform a role changeover which also takes time. In this way, production time is reduced for the component.

For example, a certain blade shell design may imply arrangement of balsa in the mould after layup of ply section no. 7. The third criterion will now trigger a search for layup plans according to the at least one first criterion which suggest a changeover of rolls after ply section no. 7.

If such a layup plan exists, it may then be considered as the layup plan selected for the manufacturing of that particular blade shell design.

Thus according to these embodiments utilizing the third criterion together with the at least one first criterion, it may be acceptable with a slight increase in the remaining amount of fibre material waste on the plurality of rolls which is then compensated for by savings in the time spent to produce the wind turbine blade component by performing a changeover of rolls simultaneously with the arrangement of core material in the mould.

Consequently, criterions for optimizing a layup plan may be:
1. Waste %
2. Roll change overs
3. Best deciding plan before applying core material such as Balsa wherein the first criterion can be used alone or in a combination with the second and/or the third criterion.

FIG. 9 illustrates an example with a table of a layup plan for a wind turbine blade component according to the invention.

The plan in the table includes a sequence of 39 ply sections having lengths ranging from 10 to 47.5 meters as illustrated in the first and second column suggesting a wind turbine blade component with a length close to 50 meters.

The ply sections in the example are laid up in a blade mould with a lay-up head using fibre material taken from four rolls (labelled 1 to 4). Each roll comprises initially 300 meter of fibre material but 1% of the length is subtracted to provide 297 meters of real length which the ply sections are taken from. The subtracted 1% is a minimum limit/Target2 value for the length of fibre material on a roll as also explained above in connection with FIG. 5.

The ply sections nos. 1 to 7 in the sequence of the layup plan are taken from roll no. 1. The lengths of ply sections no. 1 to 7 sum up to 295 meters leaving 2 meters of fibre material waste i.e. an almost full use of the fibre material on roll no. 1.

The ply sections nos. 8 to 11 in the sequence of the layup plan are taken from roll no. 2. The lengths of ply sections no. 8 to 11 sum up to 147 meters leaving 150 meters of fibre material on the roll i.e. only a partly use of roll no. 2 in the layup plan and the roll is stored temporarily for later use.

The ply sections nos. 12 to 32 in the sequence of the layup plan are taken from rolls nos. 3 and 4 leaving fibre material waste of 6 meters and 1 meter, respectively, on the rolls.

The ply sections no. 33 to 39 in the sequence of the layup plan are taken from the 150 meters of fibre material on the reintroduced roll no. 2 leaving 2 meters of fibre material waste on the roll.

The remaining amount of fibre material waste (2+6+1+2=11 meters) in the example is hereby optimised to a value of less than 1% of the initial length (4*297=1.188 meters) of fibre material on the rolls even though the fibre material waste on roll no. 3 is higher than 2% (6/297*100).

The number of roll changeovers in the example is the same as if new full roles had been introduced each time the next ply length was longer then the length of the material remaining on the role. This is because changeover to a fifth full role would have been necessary to perform the layup without optimization. Accordingly the waste of fibre material is significantly reduced.

It is easily contemplated that in other cases, the reduction of waste may come at a price of additional changeovers to better utilize the available fibre material on the roles.

In the above description, various embodiments of the invention have been described with reference to the drawings, but it is apparent for a person skilled within the art that the invention can be carried out in an infinite number of ways, using e.g. the examples disclosed in the description in various combinations, and within a wide range of variations within the scope of the appended claims.

LIST OF REFERENCE NUMBERS

1. Wind turbine
2. Wind turbine tower
3. Wind turbine nacelle
4. Wind turbine rotor
5. Wind turbine hub
6. Wind turbine blade in the rotor
7. System for manufacturing a wind turbine blade component
8. Mould for a wind turbine blade component
9. Layup head for layup of fibre material in the mould
10. Roll of fibre material positioned in a layup head
11. Fibre material being positioned by the layup head
12a. Stored rolls of fibre material in or at the layup head
12b. Stored rolls of fibre material in or at the layup head
13. Lifting means for performing roll changeovers
14. Computing means
15. Wagon and wheels for moving the layup head
16. Hinge mechanism for turning the mould
17-20. Flow diagram steps
L. Length of a wind turbine blade
X1-Xn. Ply sections X1 to Xn with length (X1) to length (Xn) in the direction of the layup

The invention claimed is:

1. A method for manufacturing a wind turbine blade component using a layup head for automatic or semi-automatic layup of fibre material as ply sections or strips from respective rolls of a plurality of rolls in a blade component mould, said method comprising the steps of:
   a) defining a list of ply sections for the blade component including a layup sequence for the ply sections and a length of each ply section;
   b) generating a selection of layup plans using at least said list of ply sections, at least a subset of said plurality of rolls and the initial lengths of fibre material on said plurality of rolls;
   c) selecting one layup plan of said selection of layup plans in constraint of at least one first criterion and at least one second criterion, said at least one first criterion comprises optimisation of a remaining amount of fibre material waste on said plurality of rolls in a length direction, and said at least one second criterion comprises optimisation of a number of additional changeovers of rolls in said layup head with respect to an ideal number of changeovers; and
   d) controlling the layup head and said plurality of rolls with computing means to perform the selected layup plan in manufacturing of the blade component in the blade component mould.

2. The method according to claim 1, wherein each of said layup plans comprise different sequence sets of consecutive ply sections from said list of ply sections distributed on said at least a subset of said plurality of rolls to perform layup of the full list.

3. The method according to claim 2, wherein said sequence sets of consecutive ply sections distributed on a roll are generated within a first and second predefined target value of the initial length (X) on the roll and/or subsections hereof.

4. The method according to claim 3, wherein said subsections of an initial length (X) on a roll are a predefined number of subsections.

5. The method according to claim 3, wherein said predefined subsections are ½*initial length (X/2), ⅓*initial length (X/3), ¼*initial length (X/4) . . . until 1/n*initial length (X/n) reaches a predefined minimum length.

6. The method according to claim 3, wherein said predefined subsections are the initial length minus a value (X−value), initial length minus twice the value (X−2*value), initial length minus three times the value (X−3*value) . . . until a predefined minimum length is reached.

7. The method according to claim 3, wherein said first and second predefined target values are in the range of 0.90 to 0.97 and 0.99 to approx. 1.00*the initial length (X) of the roll and/or subsections hereof, respectively.

8. The method according to claim 1, wherein said criterion of the selected layup plan comprises a remaining amount of fibre material waste of less than 1% of the initial length of fibre material on said at least a subset of said plurality of rolls.

9. The method according to claim 1, wherein said number of changeovers is the same or less than a predefined limit value in the manufacturing of the wind turbine blade component.

10. The method according to claim 1, wherein a third criterion for selecting one layup plan comprises a timing of changeovers of rolls with a requirement for placing a core material in the blade component mould so that the changeover is performed while the core material is placed in the mould.

11. The method according to claim 1, wherein mathematical combinatorics is used in generating said selection of layup plans.

12. The method according to claim 1, wherein said generating a selection of layup plans is performed with computing means.

13. The method according to claim 7, wherein said first and second predefined target values are 0.95 and 0.99, respectively.

14. The method according to claim 9, wherein said number of changeovers is the same or less than 4 changeovers, 5 changeovers or 6 changeovers.

15. The method according to claim 11, wherein the mathematical combinatorics comprises tree structure modelling.

16. A method for manufacturing a wind turbine blade component using a layup head for automatic or semi-automatic layup of fibre material as ply sections or strips from respective rolls of a plurality of rolls in a blade component mould, said method comprising the steps of:
   a) defining a list of ply sections for the blade component including a layup sequence for the ply sections and a length of each ply section;
   b) generating a selection of layup plans using at least said list of ply sections, at least a subset of said plurality of rolls and the initial lengths of fibre material on said plurality of rolls;
   c) selecting one layup plan of said selection of layup plans in constraint of at least one first criterion and at least one second criterion, said at least one first criterion comprises optimisation of a remaining amount of fibre material waste on said plurality of rolls in a length direction, and said at least one second criterion comprises a timing of changeovers of rolls with a requirement for placing a core material in the blade component mould so that a changeover is performed while the core material is placed in the blade component mould; and
   d) controlling the layup head and said plurality of rolls with computing means to perform the selected layup plan in manufacturing of the blade component in the blade component mould.

17. A method for manufacturing a wind turbine blade component using a layup head for automatic or semi-automatic layup of fibre material as ply sections or strips from respective rolls of a plurality of rolls in a blade component mould, said method comprising the steps of:
   a) defining a list of ply sections for the blade component including a layup sequence for the ply sections and a length of each ply section;
   b) generating a selection of layup plans using at least said list of ply sections, at least a subset of said plurality of rolls and the initial lengths of fibre material on said plurality of rolls, wherein each of said layup plans comprise different sequence sets of consecutive ply sections from said list of ply sections distributed on said at least a subset of said plurality of rolls to perform layup of the full list, and wherein said sequence sets of consecutive ply sections distributed on a roll are generated within a first and second predefined target value of the initial length (X) on the roll and/or subsections hereof, and wherein said subsections are ½*initial length (X/2), ⅓*initial length (X/3), ¼*initial length (X/4) . . . until 1/n*initial length (X/n) reaches a predefined minimum length;
   c) selecting one layup plan of said selection of layup plans in constraint of at least one first criterion, said at least one first criterion comprises optimisation of a remaining amount of fibre material waste on said plurality of rolls in a length direction; and
   d) controlling the layup head and said plurality of rolls with computing means to perform the selected layup plan in manufacturing of the blade component in the blade component mould.

18. A method for manufacturing a wind turbine blade component using a layup head for automatic or semi-automatic layup of fibre material as ply sections or strips from respective rolls of a plurality of rolls in a blade component mould, said method comprising the steps of:
   a) defining a list of ply sections for the blade component including a layup sequence for the ply sections and a length of each ply section;
   b) generating a selection of layup plans using at least said list of ply sections, at least a subset of said plurality of rolls and the initial lengths of fibre material on said plurality of rolls, wherein each of said layup plans comprise different sequence sets of consecutive ply sections from said list of ply sections distributed on said at least a subset of said plurality of rolls to perform layup of the full list, and wherein said sequence sets of consecutive ply sections distributed on a roll are generated within a first and second predefined target value of the initial length (X) on the roll and/or subsections hereof, and wherein said subsections are the initial length minus a value (X−value), initial length minus twice the value (X−2*value), initial length minus three times the value (X−3*value) . . . until a predefined minimum length is reached;
   c) selecting one layup plan of said selection of layup plans in constraint of at least one first criterion, said at least one first criterion comprises optimisation of a remaining amount of fibre material waste on said plurality of rolls in a length direction; and
   d) controlling the layup head and said plurality of rolls with computing means to perform the selected layup plan in manufacturing of the blade component in the blade component mould.

\* \* \* \* \*